United States Patent [19]

Yuto

[11] Patent Number: 4,963,615

[45] Date of Patent: Oct. 16, 1990

[54] PNEUMATIC TIRES

[75] Inventor: Kazuaki Yuto, Higashimurayama, Japan

[73] Assignee: Bridgestone Corporation, Tokyo, Japan

[21] Appl. No.: 364,040

[22] Filed: Jun. 9, 1989

[30] Foreign Application Priority Data

Jun. 10, 1988 [JP] Japan ................................ 63-141841

[51] Int. Cl.$^5$ ........................... C08K 3/04; C08L 9/06
[52] U.S. Cl. ..................................... 524/496; 524/495; 525/237; 152/209 R
[58] Field of Search ................ 524/495, 496; 525/237; 152/209 R

[56] References Cited

U.S. PATENT DOCUMENTS

| | | | |
|---|---|---|---|
| 4,398,582 | 8/1983 | Yuto et al. ........................ | 524/496 |
| 4,471,093 | 9/1984 | Furukawa et al. ................ | 525/237 |
| 4,485,205 | 11/1984 | Fujimaki et al. ................. | 525/237 |
| 4,510,291 | 4/1985 | Kawakami ........................ | 525/237 |

Primary Examiner—Allan M. Lieberman
Attorney, Agent, or Firm—Sughrue, Mion, Zinn, Macpeak & Seas

[57] ABSTRACT

A pneumatic tire comprises a tread portion comprised of a rubber composition consisting of a particular rubber blend and a particular carbon black and having specified rubber properties as a vulcanizate, and has highly improved all-weather type running performances and excellent wear resistance.

4 Claims, 1 Drawing Sheet

PNEUMATIC TIRES

BACKGROUND OF THE INVENTION

1. Field of the Invention

This invention relates to pneumatic tires, and more particularly to a pneumatic tire having high allweather type running performances and excellent wear resistance, or a pneumatic tire applicable as a passenger car bias tire, a passenger car radial tire or a motorcycle tire and having satisfactory running performances for providing sufficient road gripping force on dry road surfaces in fine weather, wet road surfaces in rainy weather and so-called ice snow road surfaces covered with ice and/or snow as well as excellent wear resistance.

2. Related Art Statement

Heretofore, there have been known various techniques for obtaining high running performance tires. For example, each of Japanese Patent laid open Nos. 55-60539 and 55-86827 discloses a tread rubber composition having an improved road gripping force on wet road surfaces by compounding a polymer having a high glass transition temperature so as to give a large loss factor around room temperature, for example, styrene-butadiene rubber having a high bound styrene content, or compounding large amounts of carbon black and oil in order to ensure a high road gripping force.

Further, there are known tires running on ice and snow roads or so-called snow tires and studless tires. For example, Japanese Patent laid open No. 59-206209 discloses a pneumatic tire having an improved road gripping force on ice and snow road surfaces by using a tread rubber composition consisting essentially of a polymer having a low glass transition temperature, i.e. a rubber selected from polybutadiene rubber, polyisoprene rubber and natural rubber.

Moreover, Japanese Patent laid open No. 62-62840 discloses a tire having high all-weather running performances by using a tread rubber composition compounded with an ester series low temperature softening agent.

The tread rubber disclosed in the above Japanese Patent laid open Nos. 55-60539 and 55-86827 cures at a low temperature, so that when the tire is run on icesnow road surfaces a sufficient friction force can not be given to the tire between the ground contact portion of the tire and the ground surface. Hence the running is not easy and also the wear resistance is insufficient.

On the other hand, the tire disclosed in the above Japanese Patent laid open No. 59-206209 exhibits satisfactory performances on ice-snow road surfaces, but has drawbacks as the wear resistance is poor and also sufficiently high running performances are not obtained because the hardness of the tread rubber around room temperature is too low and the friction coefficient of the tread rubber itself is low.

Moreover, the tire disclosed in the above Japanese Patent laid open No. 62-62840 is a tire having high all-weather running performances, but the wear resistance is not still sufficient.

SUMMARY OF THE INVENTION

It is, therefore, an object of the invention to solve the aforementioned problems of the conventional techniques and to provide a pneumatic tire having high all-weather type running performances and an improved wear resistance.

The inventors have made studies for solving the above problems and found that the above object can be achieved by compounding a particular reinforcing carbon black with a rubber blend consisting of a high styrene content rubber ingredient of an emulsion-polymerized styrenebutadiene copolymer having a high bound styrene content and a low styrene content rubber ingredient of at least one conjugated diene polymer other than the above, and as a result the invention has been accomplished.

According to the invention, there is the provision of a pneumatic tire comprising a tread portion, a sidewall portion and a bead portion, characterized in that said tread portion is comprised of a rubber composition obtained by compounding 40~80 parts by weight of carbon black having a specific surface area of nitrogen adsorption ($N_2SA$) of 146~159 $m^2/g$ and satisfying the following relation:

$$, S \leq 0.375\ Dn + 0.69 \tag{1}$$

(wherein S is a distribution width of particle size as a unit of $m\mu$ and Dn is an arithmetic mean particle size as a unit of $m\mu$ measured by means of an electron microscope) with 100 parts by weight of a rubber blend consisting of 15~50 parts by weight of a high styrene content rubber ingredient composed of an emulsion-polymerized styrene-butadiene copolymer having a bound styrene content of 30~50% by weight and the balance of a low styrene content rubber ingredient composed of at least one conjugated diene polymer other than the above emulsionpolymerized styrene-butadiene copolymer, at least one of which polymers being a styrene-butadiene copolymer, and having an average bound styrene content of not less than 15% by weight but less than 30% by weight in a total of said polymers constituting said low styrene content rubber ingredient, and said rubber composition has a modulus at $-20°$ C. and 100% elongation of not more than 40 $kg/cm^2$ and a loss factor (tan $\delta$) at 30° C. of not less than 0.3 as a vulcanizate.

BRIEF DESCRIPTION OF THE DRAWING

The invention will be described with reference to the accompanying drawing, wherein.

DESCRIPTION OF THE PREFERRED EMBODIMENTS

Figure 1:
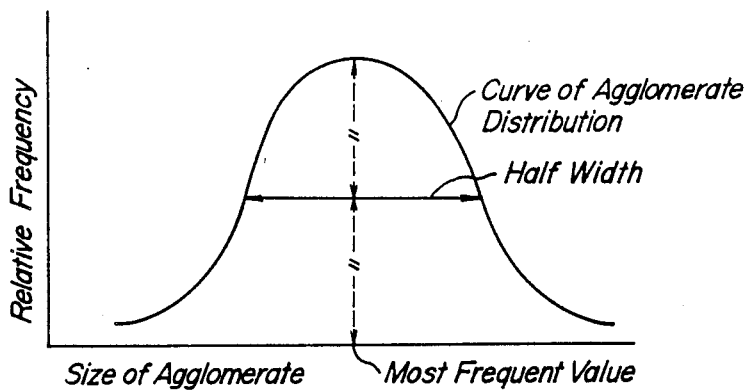
FIG. 1 is a graph showing a relation between agglomerate size and relative frequency in carbon black.

In the rubber composition according to the invention, the high styrene content rubber ingredient is composed of a emulsion-polymerized styrene-butadiene copolymer having a bound styrene content of 30~50% by weight (hereinafter referred to as high styrene content SB emulsion copolymer) is compounded at an amount of 15~50 parts by weight. The high styrene content SB emulsion copolymer having a bound styrene content in the above range has an appropriately high glass transition temperature and the loss of tread rubber around room temperature and provides a high gripping road force. However, then the compounding amount exceeds 50 parts by weight, sufficient wear resistance is not obtained and ice-snow performances are insufficient because the SB emulsion copolymer is cured at a low temperature. While, when the amount is less than 15 parts by weight, the desired running performances on dry and wet road surfaces can not be obtained.

The remaining low styrene content rubber ingredient constituting the rubber blend is comprised of at least one conjugated polymer other than the above high styrene content SB emulsion copolymer. The conjugated diene polymer constituting the low styrene content rubber ingredient may be a polymers obtained through an emulsion polymerization process or polymers obtained through a solution polymerization process. However, at least one of the conjugated polymers should be a polymer containing bound styrene, i.e. styrene-butadiene copolymer. In any case, the low styrene content rubber ingredient must have an average bound styrene content of not less than 15% by weight but less than 30% by weight as a whole. The styrene-butadiene copolymer as the low styrene content rubber ingredient includes a uniform copolymer as well as a styrene-butadiene copolymer having a distribution width of bound styrene content of not less than 30% when the bound styrene is partly existent in the molecule of the polymer. Moreover, the distribution width of bound styrene content is measured by cross fractionation using cyclohexane/isooctane mixed solvent and benzene/methyl ethyl ketone according to a Teramachi's method [J. Macromol Sci. Chem., A4(8), page 1785 (1970)]. The total styrene-butadiene copolymer as the low styrene content rubber ingredient is preferably compounded at an amount of 30~85 parts by weight based on 100 parts by weight of the rubber blend. When the low styrene content rubber ingredient is comprised of two or more conjugated polymers, at least one conjugated diene homopolymer such as natural rubber (NR), synthetic polyisoprene rubber (IR), polybutadiene rubber (BR) and the like may be included at an amount of not more than 20 parts by weight in total.

When the average bound styrene content of the low styrene content rubber ingredient is less than 15% by weight, the desired high running performances are not obtained, while when it not less than 30% by weight, the wear resistance and ice-snow performance largely lower.

The low styrene content rubber ingredient has a lower glass transition temperature because the average bound styrene content is low, and improves the curing resistance at low temperature of the rubber composition as a whole and hence the ice-snow performances, and further can attain the improvement of the balance with the other properties.

Therefore, the compounding ratio of the high styrene content rubber ingredient to the low styrene content rubber ingredient defined in the rubber blend according to the invention is required to be balanced to maintain high allweather type running performances such as road gripping force, hardness, resistance to heat buildup and the like. If such a compounding ratio is outside of the range defined in the invention, the balance of the above performances is destroyed and the object of the invention can not be achieved.

In the carbon black used in the invention, the reason why the specific surface area of nitrogen adsorption ($N_2SA$) is limited to a range of 146~159 $m^2/g$ is due to the fact that when it is less than 146 $m^2/g$, it is difficult to obtain the desired wear resistance, while when it exceeds 159 $m^2/g$, the dispersion of carbon black in the rubber composition is poor and the wear resistance becomes undesirably degraded.

Further, the reason why the distribution width (S) of carbon black as measured by means of an electron microscope is limited to a range satisfying the following relation:

$$S \leq 0.375 Dn + 0.69 \quad (1)$$

is due to the fact that a large particle size portion in the above particle size distribution, is cut off to remove a low reinforced portion and make the reinforcibility of the carbon black high. That is, the wear resistance is improved and further the loss factor (tan $\delta$) around room temperature is increased to furthermore enhance the running performances.

According to the invention, the reason why the compounding amount of the reinforcing carbon black having the above properties is limited to a range of 40~80 parts by weight based on 100 parts by weight of the rubber blend is due to the fact that when the amount is less than 40 parts by weight, the loss factor (tan $\delta$) around room temperature becomes too small and it is difficult to obtain the desired high running performances, while when it exceeds 80 parts by weight, the modulus becomes too high and it is difficult to obtain the given modulus at low temperature.

Further, when the carbon black according to the invention satisfies the following relation:

$$\Delta_{50} \leq Dst - 18$$

(wherein Dst is a mode size (m$\mu$) of agglomerate in carbon black through a centrifugal settling process and $\Delta D_{50}$ is a half width (m$\mu$) of the mode size), the performances on snow roads and the processability can further be improved. In this case, large size portions of the agglomerate are cut off, so that the degradation of performances on snow due to the increase of the modulus, as well as the degradation of processability due to the increase of viscosity in the unvulcanized rubber, are prevented.

Moreover, the carbon black used in the invention is preferable to have a coloring force (tinting value) of 124~141. When the tinting value is less than 124, the effect of further improving the wear resistance and running performances is not obtained, while when it exceeds 141, the dispersibility into rubber is insufficient and the processability and wear resistance tend to lower.

The rubber composition according to the invention is required to have a modulus at $-20°$ C. and 100% elongation of not more than 40 kg/$cm^2$ and a loss factor (tan $\delta$) at 30° C. of not less than 0.3 as a vulcanizate. When the modulus at $-20°$ C. and 100% elongation is more than 40 kg/$cm^2$, it is difficult to obtain desired performances on severe ice and snow. Preferably, the modulus is not more than 35 kg/$cm^2$. Further, when the tan $\delta$ at 30° C. is less than 0.3, it is difficult to obtain the desired high running performances. Preferably, the tan $\delta$ is not less than 0.35.

In the rubber composition according to the invention, it can generally be said that the high allweather type running performances are born by the rubber blend being a combination of the high styrene content rubber ingredient and the low styrene content rubber ingredient, while high wear resistance is born by the particular carbon black. The rubber blend and carbon black are closely related to each, other, so that the above performances can be balanced and simultaneously be established by properly selecting the kind and amount of the rubber and carbon black used without damaging each of these performances.

If necessary, the rubber composition according to the invention may be compounded with proper amounts of additives usually used in the rubber composition such as sulfur as a vulcanizing agent, vulcanization accelerator, accelerator activator, antioxidant, softening agent, filler and the like.

The following examples are given in illustration of the invention and are not intended as limitations thereof.

EXAMPLES 1~5, Comparative Examples 1~4

Among carbon blacks used in these examples, carbon S was an experimentally prepared carbon black, which can be produced in an exclusive furnace for the production of hard carbon black through a furnace process for usual rubber. In this case, the production condition was mainly changed as follows:

(1) The starting oil was equally sprayed to disperse as uniform oil droplets.

(2) These oil droplets were maintained so as not to expose such to an excessively high temperature over a long period of time in order to prevent the recirculation of suspended carbon agglomerates in the burnt product, whereby the size distribution of the agglomerate was narrowed to remove the large size portion of the agglomerate.

(3) The linear velocity (flowing rate) at the reaction zone was raised to change the quenching position with water for effective quenching.

(4) The furnace for the hard carbon black was used as a reaction furnace.

The measurement for the properties of the carbon black was as follows:

(a) Specific surface area of nitrogen adsorption ($N_2SA$)

It was measured according to ASTM D-3037.

(b) Arithmetic mean particle size (Dn) through an electron microscope and particle size distribution width S (standard deviation)

The carbon black sample was dispersed in chloroform by an ultrasonic washing process (dispersing conditions: frequency 28 kHz, 30 minutes). Then, the dispersion sample was fixed to a carbon black supporting membrane and photographed using an electron microscope at a direct magnification of 20000 times and total magnification of 80000~100000 times. Thereafter, the diameter of 1000 carbon black particles was measured from the thus obtained microphotograph to form a histogram of 3 m$\mu$ section, from which the arithmetic mean particle size (Dn) was determined as m$\mu$.

(c) Mode size (Dst) of agglomerate and half width ($\Delta D_{50}$)

The distribution of the carbon black agglomerates through a centrifugal settling process was measured by the following method using a disc centrifuge made by Joice Leble Corporation. That is, the carbon black was weighed and added to an aqueous solution of 20% ethanol to adjust the concentration of carbon black to 0.01% by weight, which was dispersed by ultrasonic wave (e.g. 10 minutes) to form a sample solution. After the sample solution (0.25~1.00 m$\lambda$) was poured into 30 m$\lambda$ of a spinning solution (aqueous solution of 2% glycerine) through a syringe, the centrifugal settling was started by setting a revolution speed of the disc centrifuge to 6000 rpm, during which an agglomerate distribution curve was prepared by a photoelectric settling process. The half width $\Delta D_{50}$ (Dst) and most frequent value Dst (mode) were measured from FIG. 1. Moreover, portions shown by broken lines are the same length, and the half width is a length of a portion shown by a solid line.

(d) Coloring force (tinting value) of carbon black

It was measured according to JIS K-6221.

The properties of carbon blacks used in Examples and Comparative Examples are shown in the following Table 1.

TABLE 1

| Carbon black | N 339 | N 220 | N 110 | Carbon S |
|---|---|---|---|---|
| Specific surface area of nitrogen adsorption (m$^2$/g) | 92 | 114 | 141 | 155 |
| Arithmetic mean particle size Dn (m$\mu$) | 26.3 | 24.1 | 18.0 | 17.3 |
| Distribution width of particle size S (m$\mu$) | 11.06 | 9.69 | 6.9 | 6.91 |
| Calculation value S (=0.375 Dn + 0.69) (m$\mu$) | 10.55 | 9.73 | 7.44 | 7.18 |
| Mode size of agglomerate Dst (m$\mu$) | 103 | 94 | 70.5 | 68 |
| Half width of agglomerate $\Delta D_{50}$ (m$\mu$) | 91 | 67 | 55 | 47 |
| Calculation value $\Delta D_{50}$ (=Dst − 18) (m$\mu$) | 85 | 76 | 52.5 | 50 |
| Coloring force (tinting value) | 109 | 113 | 129 | 132 |

In these Examples and Comparative Examples, the modulus at −20° C. and 100% elongation and the loss factor (tan $\delta$) at 30° C. were measured with respect to rubber compositions (after vulcanization) having a compounding recipe shown in the following Table 2. Then, these rubber compositions were used as a tread rubber to manufacture nine tires having a tire size of 185/70 SR14, and the brakability on wet road surfaces, steering stability on dry road surfaces, brakability on snow and wear resistance were evaluated with respect to these tires. The measured results are also shown in Table 2. In this table, Comparative Example 1 corresponds to the conventional high running performance tire using a high running performance tread rubber or a summer tire, which is used as a control tire for the comparison with the other tires by an index. Comparative Example 2 corresponds to the conventional snow tire.

Moreover, the measurement of the above properties and the evaluation of the above performances were as follows.

(a) Modulus at −20° C. and 100% elongation

It was measured in a thermostatic chamber of −20° C. (preliminary cooling of 10 minutes) according to a tensile test method of JIS K-6301. Moreover, the sample was vulcanized for a time longer by 1.2 times than a time showing a maximum value of torque through a rheometer.

(b) Loss factor: tan $\delta$

It was measured by means of a viscoelastic spectrometer made by Iwamoto Seisakusho under conditions that the frequency was 50 cps, the static strain was the 5% and dynamic strain was 1%. Moreover, the sample was a strip-like form having a chack length of 20 mm, a width of 5 mm and a thickness of 2 mm. The vulcanization conditions were the same as in the above item (a).

(c) Brakability on wet road surfaces

The running distance till the vehicle was completely stopped was measured by braking from a speed of 40 km/hr, 70 km/hr or 100 km/hr on a wet asphalted road. The measured value was represented by an index on the basis that Comparative Example 1 was 100. The larger the numerical value, the better the property.

(d) Steering stability on dry road surfaces

The lap time was measured by running on a circuit consisting of straight course, curved course, bank and the like in a fine day. The time was represented by an index on the basis that Comparative Example 1 was 100. The larger the numerical value, the better the property.

(e) Brakability on snow

The stopping distance on snow was measured by braking from a speed of 20 km/hr, 30 km/hr or 40 km/hr during the running on snow road. The distance was represented by an index on the basis that Comparative Example 1 was 100. The larger the numerical value, the better the property.

(f) Wear resistance

After the tire was actually run on a general road over a distance of 40000 km, the running distance D of the non-controlled tire per 1 mm of worn amount was calculated from the remaining groove depth and also the running distance $D_0$ of Comparative Example 1 (control tire) was calculated, from which the wear resistance was represented by an index according to the following equation:

Wear resistance $= (D/D_0) \times 100$

The larger the numerical value, the better the property.

*1: trade name JSR BR01, made by Japan Synthetic Rubber Co., Ltd. *2: bound styrene content 23.5% *3: bound styrene content 23.5%, distribution of bound styrene 40% *4: trade name Solprene 1204, made by Asahi Chemical Industry Co., Ltd. bound styrene content 25% *5: average bound styrene content standarized based on the low styrene content rubber ingredient *6: bound styrene content 35% *7: N-phenyl-N'-isopropyl-p-phenylene diamine *8: diphenylquanidine *9: dibenzothiazyl disulfide *10: N-oxydiethyl-2-benzothiazyl sulfenamide In the rubber blends of Table 2, the emulsion-polymerized SBR A, emulsion-polymerized SBR B and solution-polymerized SBR were a styrene-butadiene copolymer capable of constituting the low styrene content rubber ingredient according to the invention or a part thereof, and NR and BR were a conjugated diene polymer capable of constituting a part of the low styrene content rubber ingredient, while the emulsion-polymerized SBR C was a high styrene content SB emulsion copolymer capable of constituting the high styrene content rubber ingredient. The compounding ratio of high styrene content rubber ingredient to low styrene content rubber ingredient in the rubber blend defined by the invention were satisfied by Comparative Examples 3 and 4 and Examples 1~5, while Comparative Example 1 was outside the above range and Compara- TABLE 2(a)

| | | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|---|
| Rubber blend | NR | | 20 | | | | | | | |
| | BR *1 | | 30 | | | | | | 10 | |
| | emulsion-polymerized SBR A *2 | 40 | 50 | 70 | 70 | 70 | | | 50 | 30 |
| | emulsion-polymerized SBR B *3 | | | | | | 70 | | | 40 |
| | solution-polymerized SBR *4 | | | | | | | 70 | | |
| | ST% of low styrene rubber ingredient *5 | 23.5 | 11.8 | 23.5 | 23.5 | 23.5 | 23.5 | 25.0 | 19.6 | 23.5 |
| | emulsion-polymerized SBR C *6 (high styrene rubber ingredient) | 60 | | 30 | 30 | 30 | 30 | 30 | 40 | 30 |
| Carbon black | N 339 | 90 | 80 | | | | | | | |
| | N 220 | | | 70 | | | | | | |
| | N 110 | | | | 70 | | | | | |
| | Carbon S | | | | | 70 | 70 | 70 | 70 | 70 |
| Aromatic oil | | 50 | 45 | 35 | 35 | 35 | 35 | 35 | 35 | 35 |
| Stearic acid | | 1 | 1 | 1 | 1 | 1 | 1 | 1 | 1 | 1 |
| ZnO | | 3 | 3 | 3 | 3 | 3 | 3 | 3 | 3 | 3 |
| | | Comparative Example 1 | Comparative Example 2 | Comparative Example 3 | Comparative Example 4 | Example 1 | Example 2 | Example 3 | Example 4 | Example 5 |
| Antioxidant IPPD | | 1 | 1 | 1 | 1 | 1 | 1 | 1 | 1 | 1 |
| Vulcanization accelerator DPG *8 | | 0.4 | 0.4 | 0.4 | 0.4 | 0.4 | 0.4 | 0.4 | 0.4 | 0.4 |
| Vulcanization accelerator DM *9 | | 0.4 | 0.4 | 0.4 | 0.4 | 0.4 | 0.4 | 0.4 | 0.4 | 0.4 |
| Vulcanization accelerator NOBS *10 | | 0.6 | 0.6 | 0.6 | 0.6 | 0.6 | 0.6 | 0.6 | 0.6 | 0.6 |
| Sulfur | | 1.8 | 1.8 | 1.8 | 1.8 | 1.8 | 1.8 | 1.8 | 1.8 | 1.8 |
| Rubber properties | modulus at $-20°$ C. and 100% elongation, kg/cm$^2$ | 85 | 25 | 41 | 44 | 34 | 38 | 32 | 35 | 34 |
| | tan $\delta$ at 30° C. | 0.40 | 0.28 | 0.31 | 0.43 | 0.39 | 0.40 | 0.38 | 0.41 | 0.42 |
| Tire performances | brakability on wet road | 100 | 80 | 98 | 101 | 102 | 104 | 102 | 104 | 104 |
| | steering stability on dry road | 100 | 85 | 98 | 99 | 102 | 103 | 101 | 103 | 103 |
| | brakability on snow | 100 | 125 | 118 | 115 | 122 | 120 | 123 | 122 | 122 |
| | wear resistance | 100 | 105 | 115 | 120 | 135 | 136 | 137 | 130 | 138 |

*1: trade name JSR BR01, made by Japan Synthetic Rubber Co., Ltd.
*2: bound styrene content 23.5%
*3: bound styrene content 23.5%, distribution of bound styrene 40%
*4: trade name Solprene 1204, made by Asahi Chemical Industry Co., Ltd. bound styrene content 25%
*5: average bound styrene content standarized based on the low styrene content rubber ingredient
*6: bound styrene content 35%
*7: N-phenyl-N'-isopropyl-p-phenylene diamine
*8: diphenylquanidine
*9: dibenzothiazyl disulfide
*10: N-oxydiethyl-2-benzothiazyl sufenamide tive Example 2 was deficient in the high styrene content rubber ingredient.

In Table 2, only carbon S used in Examples 1~5 satisfied both of specific surface area of nitrogen adsorption and the relation of formula (1) defined in the invention.

Further, only the rubber compositions used in Examples 1 5 satisfied the modulus at −20° C. and 100% elongation and the tan δ at 30° C. as the rubber property defined in the invention.

The tires of Examples 1 5 are equal to or better than the tire of Comparative Example 1 as the conventional high running performance tire in term of the brakability on wet road surfaces and the steering stability on dry road surfaces, and fairly excellent in brakability on snow and wear resistance.

As seen from these Examples and Comparative Examples, the pneumatic tires according to the invention comprise a tread portion made from a rubber composition consisting of a particular rubber blend and a carbon black having particular properties and having particular rubber properties, so that they higher allweather type running performance as compared with the conventional high running performance tires as well as having a wear resistance.

What is claimed is:

1. A pneumatic tire comprising a tread portion, a sidewall portion and a bead portion, characterized in that said tread portion is prepared from a rubber composition obtained by compounding:
   (A) 40–80 parts by weight of carbon black having a specific surface area of nitrogen adsorption ($N_2SA$) of 146–159 $m^2/g$ and satisfying the following relation:

$$S \leq 0.375 Dn + 0.69 \quad (I)$$

wherein S is a distribution width of particle size as a unit of mμ and Dn is an arithmetic mean particle size as a unit of mμ measured by means of an electron microscope, with
   (B) 100 parts by weight of a rubber blend consisting of:
      (i) 15–50 parts by weight of a high styrene content rubber ingredient comprising an emulsion-polymerized styrene-butadiene copolymer having a bound styrene content of 30–50% by weight, and the balance of said rubber blend comprising:
      (ii) a low styrene content rubber ingredient comprising at least one conjugated diene polymer other than the above emulsion-polymerized styrene-butadiene copolymer of said high styrene content rubber ingredient, at least one of the polymers in the low styrene content rubber ingredient being a styrene-butadiene copolymer having an average bound styrene content of not less than 15% by weight but less than 30% by weight in a total of said polymers constituting the low styrene content rubber ingredient, and said rubber composition has a modulus at −20° C. and 100% elongation of not more than 40 $kg/cm^2$ and a loss factor (tan δ) of 30° C. of not less than 0.3 as a vulcanizate.

2. The pneumatic tire according to claim 1, wherein said low styrene content rubber ingredient further contains not more than 20 parts by weight in total of at least one of natural rubber, synthetic polyisoprene rubber and polybutadiene rubber.

3. The pneumatic tire according to claim 1, wherein said carbon black further satisfies a relation between a mode size (Dst, mμ) of a carbon black agglomerate through a centrifugal settling process and a half value ($\Delta D_{50}$, mμ) thereof shown by the following equation:

$$\Delta D_{50} \leq Dst - 18.$$

4. The pneumatic tire according to claim 1, wherein said carbon black further has a coloring force of 124~141.

* * * * *